United States Patent
Dergachev et al.

(10) Patent No.: US 11,316,319 B2
(45) Date of Patent: Apr. 26, 2022

(54) HIGH-POWER, RARE-EARTH-DOPED CRYSTAL AMPLIFIER BASED ON ULTRA-LOW-QUANTUM-DEFECT PUMPING SCHEME UTILIZING SINGLE OR LOW-MODE FIBER LASERS

(71) Applicant: IPG PHOTONICS CORPORATION, Oxford, MA (US)

(72) Inventors: Alex Dergachev, Oxford, MA (US); Igor Samartsev, Oxford, MA (US); Valentin Gapontsev, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 16/465,021

(22) PCT Filed: Dec. 1, 2017

(86) PCT No.: PCT/US2017/064297
§ 371 (c)(1),
(2) Date: May 29, 2019

(87) PCT Pub. No.: WO2018/102738
PCT Pub. Date: Jun. 7, 2018

(65) Prior Publication Data
US 2019/0326723 A1 Oct. 24, 2019

Related U.S. Application Data

(60) Provisional application No. 62/428,628, filed on Dec. 1, 2016.

(51) Int. Cl.
H01S 3/16 (2006.01)
H01S 3/06 (2006.01)
(Continued)

(52) U.S. Cl.
CPC .......... H01S 3/1618 (2013.01); H01S 3/0606 (2013.01); H01S 3/067 (2013.01);
(Continued)

(58) Field of Classification Search
CPC ...... H01S 3/1618; H01S 3/0606; H01S 3/067; H01S 3/08004; H01S 3/08045;
(Continued)

(56) References Cited

U.S. PATENT DOCUMENTS 9,941,654 B2   4/2018  Starodoumov et al.
2006/0222372 A1* 10/2006 Spinelli ................. H01S 3/2383
                                                    398/183
(Continued)

*Primary Examiner* — Tuan N Nguyen
(74) *Attorney, Agent, or Firm* — Yuri Kateshov, Esq.

(57) ABSTRACT

A high average and peak power single transverse mode laser system is operative to output ultrashort single mode (SM) pulses in femtosecond-, picosecond- or nanosecond-pulse duration range at a kW to MW peak power level. The disclosed system deploys master oscillator power amplifier configuration (MOPA) including a SM fiber seed, outputting a pulsed signal beam at or near 1030 nm wavelength, and a Yb crystal booster. The booster is end-pumped by a pump beam output from a SM or low-mode CW fiber laser at a pump wavelength in a 1000-1020 nm wavelength range so that the signal and pump wavelengths are selected to have an ultra-low-quantum defect of less than 3%.

13 Claims, 3 Drawing Sheets

(51) Int. Cl.
*H01S 3/067* (2006.01)
*H01S 3/08* (2006.01)
*H01S 3/094* (2006.01)
*H01S 3/0941* (2006.01)
*H01S 3/23* (2006.01)

(52) U.S. Cl.
CPC ...... *H01S 3/08004* (2013.01); *H01S 3/08045* (2013.01); *H01S 3/0941* (2013.01); *H01S 3/094038* (2013.01); *H01S 3/094042* (2013.01); *H01S 3/094065* (2013.01); *H01S 3/094076* (2013.01); *H01S 3/1643* (2013.01); *H01S 3/1685* (2013.01); *H01S 3/2316* (2013.01)

(58) Field of Classification Search
CPC ......... H01S 3/094038; H01S 3/094042; H01S 3/094065; H01S 3/094076; H01S 3/0941; H01S 3/1643; H01S 3/1685; H01S 3/2316; H01S 3/08; H01S 3/16
See application file for complete search history.

(56) References Cited

U.S. PATENT DOCUMENTS

2015/0138630 A1* 5/2015 Honea .................... H01S 3/042
359/341.3
2018/0233878 A1* 8/2018 Leonardo .......... H01S 3/094046

* cited by examiner

FIG. 1
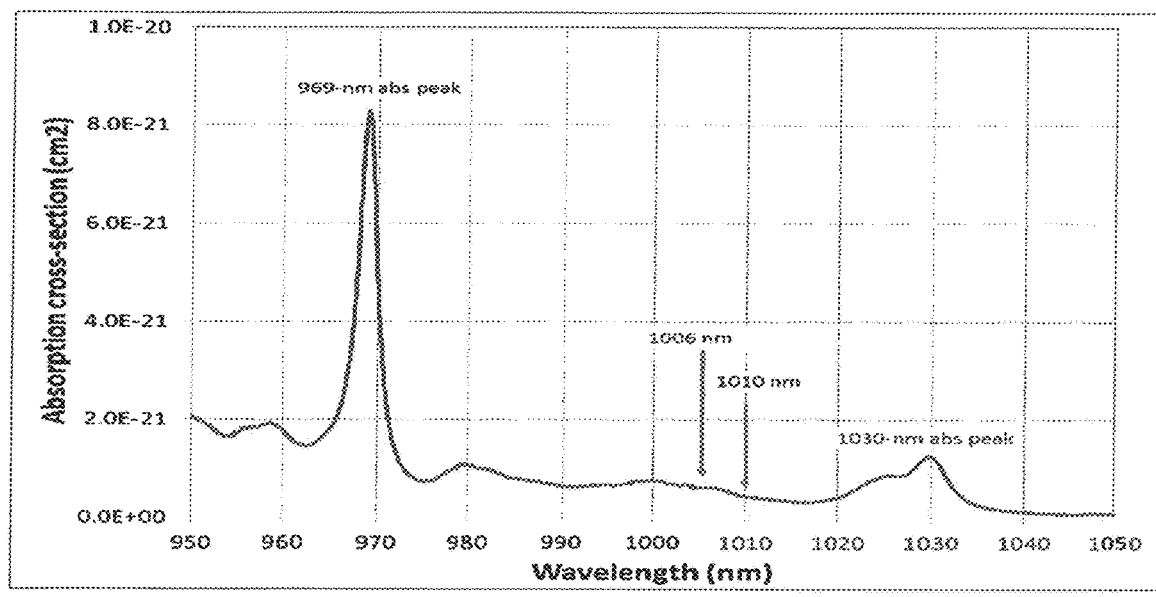
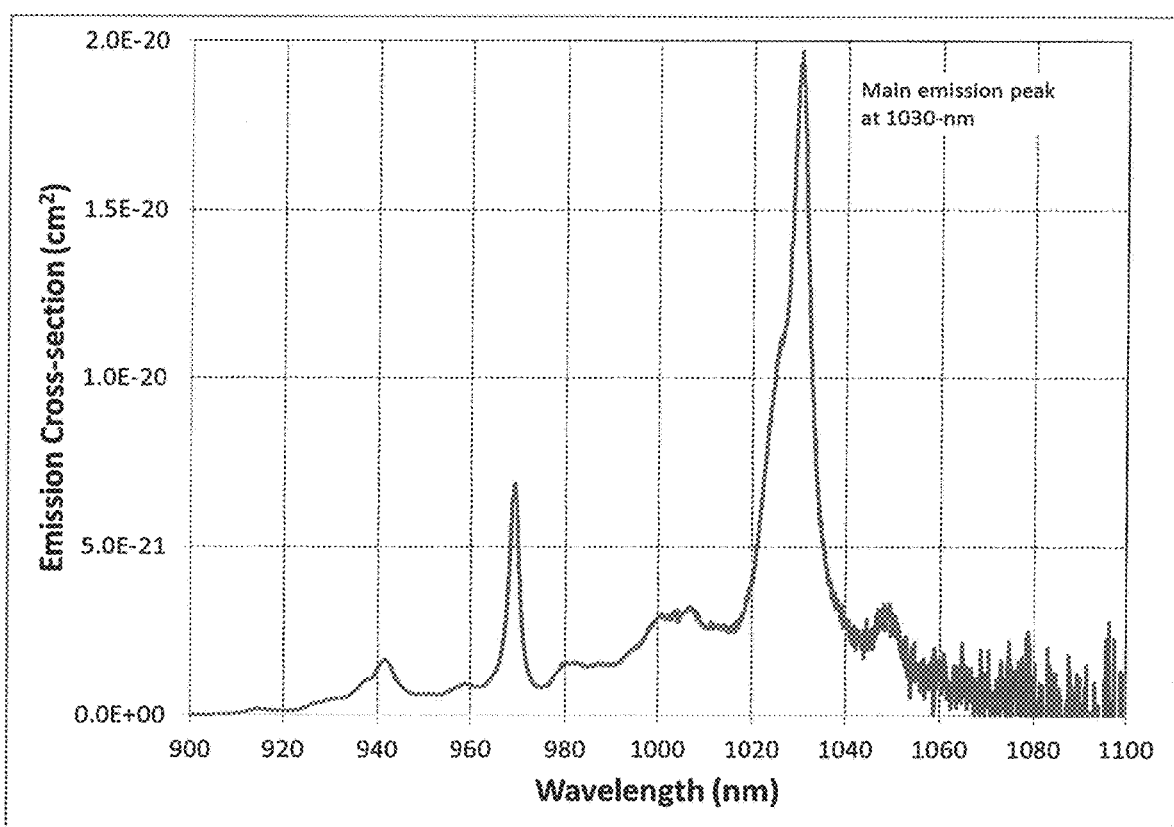
FIG. 2

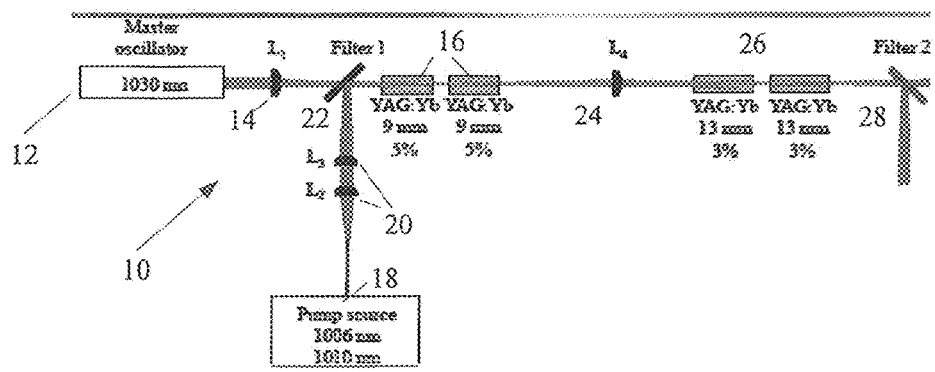
FIG. 3
Experimental results – Output/Gain vs absorbed pump
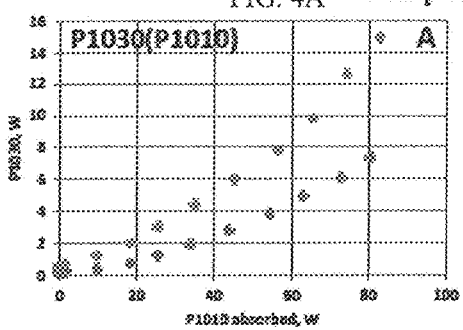
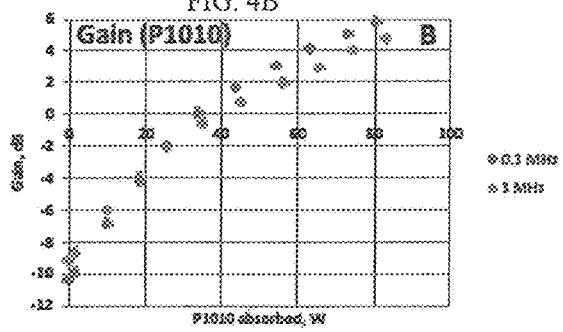
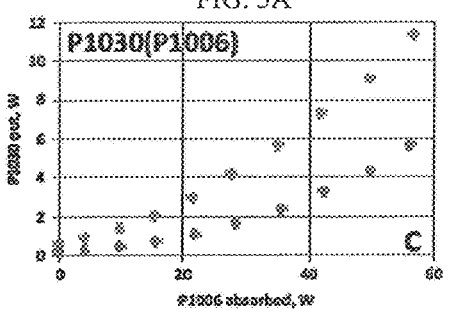
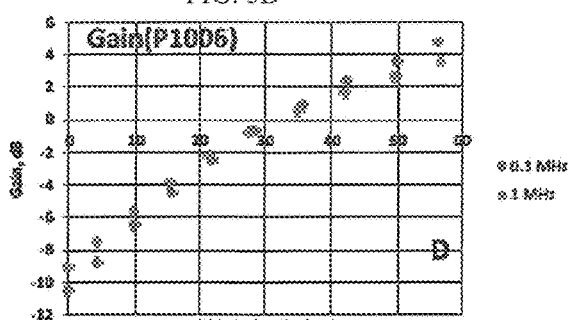

HIGH-POWER, RARE-EARTH-DOPED CRYSTAL AMPLIFIER BASED ON ULTRA-LOW-QUANTUM-DEFECT PUMPING SCHEME UTILIZING SINGLE OR LOW-MODE FIBER LASERS

BACKGROUND OF THE DISCLOSURE

Field of the Disclosure

The present disclosure relates to high-power, high-brightness, rare-earth-doped bulk ytterbium (Yb) amplifiers operating at or around 1030 nm wavelength and end-pumped by a single-transverse mode (SM) or low-mode (LM) fiber-laser operating in a 1000-1020 nm wavelength range.

Background Art Discussion

Highly-efficient, ultra-short pulsed lasers are used in limitless industrial applications. Among numerous types of solid state lasers, perhaps fiber lasers are gaining more and more popularity due to, among others, high efficiency, low maintenance, and high average power. Unfortunately, when scaled to high peak power levels, fiber lasers, particularly SM fiber lasers, fall victim to undesirable nonlinear effects limiting the attainable peak power and detrimentally affecting beam quality which, in a vast majority of applications, is required to be close to diffraction-limited. While fiber laser industry tirelessly works on improving this limitation, bulk laser solutions are considered to be a viable alternative to the SM fiber lasers.

Diode-pumping of solid-state lasers can offer many desirable properties such as compact packaging and highly efficient laser performance, so it became the main direction in solid-state lasers development. Recent advances in high-power diode lasers with wavelength between 940 and 980 nm have stimulated a renewed interest in development of diode-pumped Yb3+ doped lasers and amplifiers. Owing to its simple electronic structure based on two electronic manifolds, the ground 2 F7/2 state and the excited 2 F5/2 state, Yb3+ has advantageous spectroscopic properties well suited for diode-pumping schemes in the near-infrared. First, ytterbium generally has long storage lifetime, which is approximately four times longer than that of its Nd-doped counterparts. Second, Yb3+ ion-doped materials exhibit broad absorption bands eliminating the need to precisely control the temperature of pump diodes. Third, simple two-manifold, electronic structure leads to a low quantum defect, absence of excited state absorption, and minimal non-radiative losses with all these factors leading to reduced heat load and heat related issues. The absence of additional 4f levels in Yb3+ also eliminates the effects of upconversion, minimizes concentration quenching, so even highly-doped Yb-crystals can be utilized without concentration quenching. The most attention has been paid to Yb-doped yttrium aluminum garnet (Yb:YAG) crystal—a well-developed laser material—because of its good thermal, physical, chemical properties and laser characteristics of YAG. High-quality, highly-doped Yb:YAG crystals can be grown using traditional Czochralski (CZ) method.

However, crystal lasers and amplifiers including Yb-doped media also have well known limitations. In particular, two fundamental limitations for power scaling of diode-pumped, high-power solid state laser systems are:

1. Low-brightness of high-power diode lasers (DL) and assemblies; and
2. Significant quantum defect.

One of the fundamental limitations to power scaling of crystal amplifiers is exemplified by the DL pumping. As known, high power (multi-Watt) LDs do not generate bright light. Yet, high-brightness pump sources is one of the key technologies to increase the efficiency and power of any laser system but particularly important for pumping Yb-doped media (e.g. Yb:YAG).

Therefore a need exists in high-brightness light sources for pumping laser crystal amplifiers with low quantum defect.

The quantity of the overall optical-to-optical efficiency of the amplifier is the product of the pump efficiency $\eta P$ and the extraction efficiency rex, with $\eta P$ defined as Eacc/EP, where EP is the pump energy and Eacc the part of the stored energy that is accessible for extraction. Not all the stored energy is accessible due to the quasi-3-level nature of the Yb medium. The pump efficiency is determined by the sum of the pumping-related losses or by the product of the efficiencies $\eta i$ associated with those losses. There are several loss mechanisms including, among others, the quantum defect which, as mentioned above, is critical for increased high peak powers of crystal amplifiers.

The quantum defect is a consequence of the energy difference between lasing (extraction) photons and pump photons. The associated efficiency is given by $\eta QD = \lambda P/\lambda L$, where $\lambda P$ and $\lambda L$ are the pump and extraction (signal) wavelengths, respectively. One advantage of Yb-doped materials is their small quantum defect, the downside of which is their quasi-3-level nature. To maximize $\eta QD$, the difference between $\lambda P$ and $\lambda L$ should be minimized. If we consider Yb:YAG laser medium as an example, the extraction wavelength is typically set at the gain peak of 1030 nm ($\lambda L$). The standard approach for choosing pump wavelength is to select one of two strongest absorption peaks either at 940 or 969 nm. This allows to minimize the length of Yb-doped laser crystals used in oscillators or amplifiers in order to mitigate the issue of limited brightness of high power pump laser diodes. The use of pump wavelength $\lambda P$ of 940 nm or 969 nm corresponds to $\eta QD = 91-94\%$. In summary, smaller quantum defects are beneficial to increase the amplifier's optical efficiency, although with quasi-three level laser systems like Ytterbium a smaller quantum defect limits the level of attainable inversion. This limitation can be overcome with appropriate laser amplifier or oscillator design.

A need therefore exists for pump sources with: 1) high brightness—as close to diffraction limited as possible i.e. SM laser, and 2) pump wavelength close to the emission peak of the laser medium to minimize the quantum defect and increase the attainable optical efficiency of the crystal amplifier.

SUMMARY OF THE DISCLOSURE

The approach disclosed in this application successfully satisfies the needs identified above. The disclosed solid state laser system includes a SM fiber laser operating as a seed source which outputs pulsed signal light propagating along an optical path. A crystal amplifier receives the pulsed signal light at desired extraction wavelength and outputs amplified signal light in the form of ultrashort pulses in fs-, ps- or ns-width range. The peak power of the amplified signal light is a function of a pump assembly energizing the amplifier and can reach 10 s to 1000 s kW-levels.

In accordance with one aspect of the disclosure, the pump assembly includes one or multiple fiber laser sources outputting high-brightness, diffraction-limited (SM) pump light in a continuous wave (CW) regime. One measure of the beam quality is the brightness B which is the power per unit area divided by the solid angle of the beam divergence—watts per square centimeter per steradian. Brightness is given by dividing the power P by $\pi^2$ times the square of the beam parameter product Q:

$$B = \frac{P}{\pi^2 Q^2}$$

Therefore, with the disclosed SM fiber pump, the major limitation to the power scaling of rare-earth doped crystal amplifiers—low-brightness pump source—has been substantially minimized.

The other issue limiting the power scaling of the crystal amplifiers relates to the efficiency of a pumping arrangement. For example, in a 1 µm laser systems, 940-980 nm pump wavelength range and 1030 nm signal (extraction) wavelength are spectrally far enough to render the large quantum defect which, in turn, fundamentally limits the efficiency of a diode-pumped approach.

The latter limitation has been dealt with in a second aspect of the present disclosure. Namely, the disclosed SM Yb fiber laser pump arrangement is configured to output pump light to be in a 1000-1010-nm wavelength range which provides ultra-low quantum defect of less than 3% and preferably in a range ~2.0-2.5%. The disclosed quantum defect is substantially less than a typical quantum defect of 6-9% known for LD-pumped Yb:YAG. The small wavelength difference between signal and pump light is referred to as an ultra-low quantum-defect pumping scheme.

The advantages of an ultra-low quantum-defect pumping allows for exceptionally low heat load in the active laser media and facilitates higher extraction efficiencies up to 70-80%, which are essential for significant power scaling of the crystal amplifier.

BRIEF DESCRIPTION OF THE DRAWINGS

The above structural aspects of the present disclosure are explained in more detail hereinafter in conjunction with the following drawings, in which:

FIG. 1 is an absorption cross-sections of Yb-doped YAG.

FIG. 2 is an emission cross-section of Yb-doped YAG rod or slab.

FIG. 3 is an optical schematic of the disclosed structure with an ultra-low quantum-defect pumping.

FIGS. 4A-4B are respective output power and gain characteristics plotted against absorbed pump power at a 1010 nm.

FIGS. 5A-5B are respective output/power and gain characteristics plotted against absorbed pump power at a 1006 nm.

SPECIFIC DESCRIPTION

Figure 6:
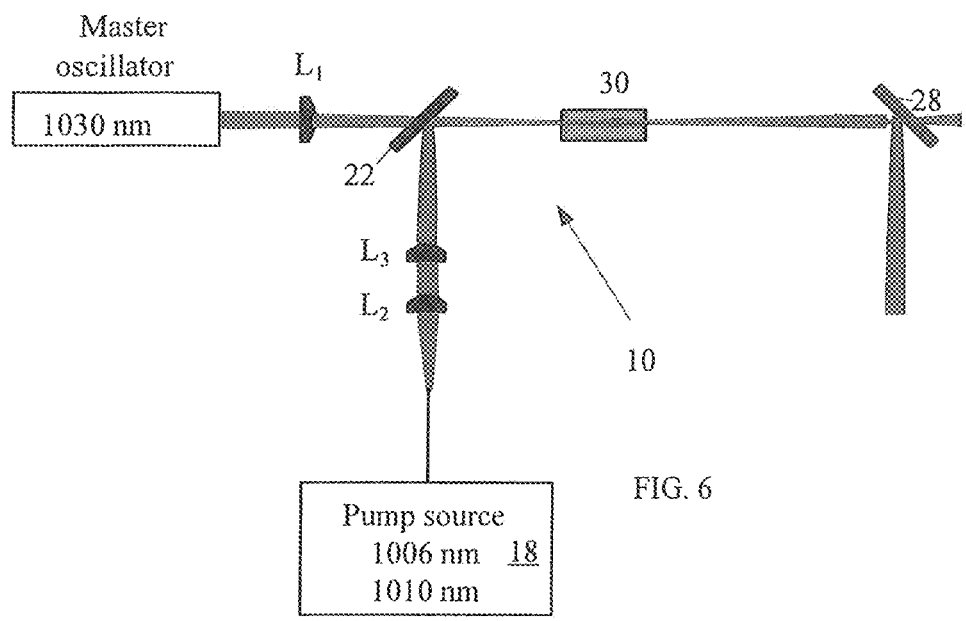
FIG. 6 illustrates a modification of the structure shown in FIG. 3.

FIGS. 1 and 2 illustrate absorption and emission cross-sections of Yb-ion doped gain media. Typically the pump wavelength is selected in 940-980-nm range which can be obtained from widely-available high power laser diodes. The extraction wavelength is set at or around the gain peak of 1030 nm±less than 5 nm. In contrast, the present disclosure teaches another, unconventional approach of pumping in 1 µm wavelength range with a particular interest in 1000-1020 nm and advantageously a 1006-1010 nm wavelength range utilizing SM high brightness fiber laser(s).

FIG. 3 illustrates an exemplary laser system 10 illustrating the present disclosure and operable as a standalone amplifying system, such as a high power amplifier or booster, or part of a larger, more complicated amplifying system. Configured to have a master oscillator power amplifier (MOPA) architecture or be a standalone booster amplifier, laser system 10 is operative to output ultrashort pulses of signal light at 1030 nm wavelength in a fs-, ps- or ns-pulse duration range which is of particular interest for many industrial applications. The desired pulse duration is provided by a seed 12 operative to output signal light at the desired signal light wavelength and pulse repetition rate. The seed 12 is preferably a pulsed, SM fiber laser, operating in a pure pulse or burst regimes. The fiber laser/oscillator may be mode-locked. The configuration of seed 12 may also include, in addition to the fiber oscillator, one or multiple pre-amplifying stages. The use of high power diode laser without the fiber oscillator is conceivable, but less effective since the brightness of diode laser cannot be compared to that of the fiber oscillator. The linewidth depends on the pulse duration but preferably varies in a 4-7 nm range.

As the output signal light propagates over a light path, it impinges upon optics $L_1$ 14 which focuses the signal light inside of Yb:YAG crystal 16 which may have various geometrical shapes and dimensions including rods and thin slabs. The latter can be plate-shaped body having a small width, for example 2 mm, and a relatively great length reaching, for instance, 6 cm. Besides the Yb:YAG crystal, the use of Yb oxide ceramics, such as $Yb_2O_3$, particularly when the above-mentioned plate configuration is used, maybe highly beneficial because of the possibility of a very high dopant (Yb) concentration.

The Yb booster is operative to amplify SM signal light to kW-MW peak power levels and energy per pulse ranging between several hundred miCrjoules to several millJoules. Such a high peak-power output with diffraction-limited beam is a result of a pump arrangement (pump) 18 outputting a pump beam which is coupled into one of opposite facets of the Yb crystal booster while propagating either in the same direction as or in direction counter to that of the signal beam. The configuration of pumping the Yb booster at the opposite ends thereof is also possible. Regardless of the propagation direction, the signal and pump beams propagate in a collinear manner overlapping one another in a range varying between 80% and, under certain conditions, 100% with the overlap exceeding 90% obviously being advantageous.

The pump 18 is configured with a fiber laser, in this case, doped with Yb ions and operates in CW regime to output a high-brightness pump light in the 1000-1020 nm wavelength range. The $M^2$ of the pump light varies from 1 to 10 with a range between 1 and 2 being preferable. Accordingly, pump 18 may be configured as a single mode or low mode CW fiber laser outputting pump high brightness light beam through focusing optics $L_2$ and $L_3$ 20 before it impinges upon a filter or wavelength discriminator F1.

The filter F1 is configured as a dichroic mirror, as shown, or volume Bragg grating (VBG) 22 with the latter being particularly practical when signal and pump beams propagate at respective wavelengths λs and λp that are very close to one another. Regardless of a particular configuration and beam propagation direction, filter 22 is transparent to the signal light and reflects the pump light such that both signal and pump beams propagate in the above describer collinear and sometimes coaxial manner. In reality, the signal and pump beams may diverge from one another at a very small angle less than 1° which is not detrimental to the overall performance of the disclosed system. The overlapped beams simultaneously impinge against one of the faucets of amplifier with pump 18 and amplifier 16 being the end pumping configuration. The amplifier 16 may include multiple crystals or ceramic parts defining respective amplifying cascades 16 and 26 or single cascade 16 as shown in FIG. 6. If the multi-cascaded amplifying arrangement is deployed, another focusing lens $L_4$ 24 is installed so as to focus the beams inside the downstream crystal amplifying cascade 26.

FIGS. 4A-4B illustrate respective output power and gain of the crystal amplifier relative to 1010 nm pump power. The graphs are obtained at lower pulse repetition rate (prr) of 0.1 MHz (blue dots) and higher prr of 1 MHz (red dots). It can be seen that the seed average power affects the attainable gain and output power from the crystal amplifier. FIGS. 4C-4D illustrate the same tendencies at 1006 nm pump.

FIGS. 5A, 5B illustrate amplified spectra at the output of the disclosed system at respective 1010 and 1006 nm wavelength of pump light at 1 MHz prr. As can be seen, blue curve corresponds to maximum pump power which is 183.5 W for 1010 nm ump wavelength and 93.5 for 1006 nm pump wavelength in one of many experimental setups.

FIG. 6 illustrates a modification of system 10. Here instead of two amplifying cascades, each having with a pair of crystals, one amplifying cascade with a single crystal 30 is used. Generally the length of the crystal and dopant concentration may be selected in respective wide ranges. For optimization purposes, increasing the length of the crystal necessitates lowering the dopant concentration and vice versa. Generally, the concentration range may include any reasonable percentage number usually limited by about 20%, whereas the crystal length may be as long as tens of centimeters, with the best results obtained so far with the crystal length less than 1 centimeter. The rest of the shown components remain identical to those used in FIG. 3. Similar to the embodiment of FIG. 3, signal and pump light beams at respective 1030 and 1010 nm wavelengths propagate coaxially along the light path downstream from filter 22 which can be either a dichroic mirror or VBG.

Extensive experiments with both schematics of FIGS. 3 and 6 show that amplified signal light is more powerful at 1006 nm pump wavelength than at 1010 nm pump wavelength, which is well understood since inversion is higher at the shorter pump wavelengths, provided, as here, all other conditions are the same. These conditions include seed power, absorbed pump power and seed/pump beams sizes, The measured absorption coefficient in Yb: YAG 16 of of FIG. 3 is about 1,5x higher at 1006 nm pump wavelength than at 1010 nm pump wavelength. Importantly, the detrimental lensing effect is minimal for both 1006 and 1010 nm pump wavelengths which is readily explained by a small quantum effect at both disclosed pump wavelengths. The beam size remains essentially the same the change of less than 3%-within a seed power range from 2 W to 7W and/or pump power range between 93 W and 180 W. As can be well understood, the pump power may be unlimited and reach kW levels. The pulse energy is a function pump power and also varies within a broad range energy from several hundred micrjoules to several milljoules. pis The schematic shown in FIG. 6 In contrast, the thermal lens effect certainly manifests itself at 969 rim pump wavelength of FIG. 6. The beam size changes about 21% with pump power increase from 0 to 97.5 W at both low and high prr.

Figure 7A:
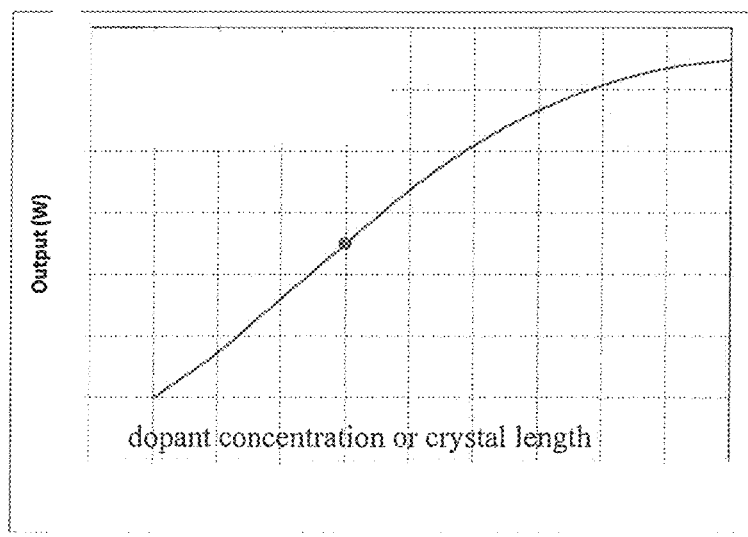
FIG. 7A is the output power of the disclosed bulk amplifier plotted against dopant concentration or crystal length.
Figure 7B:
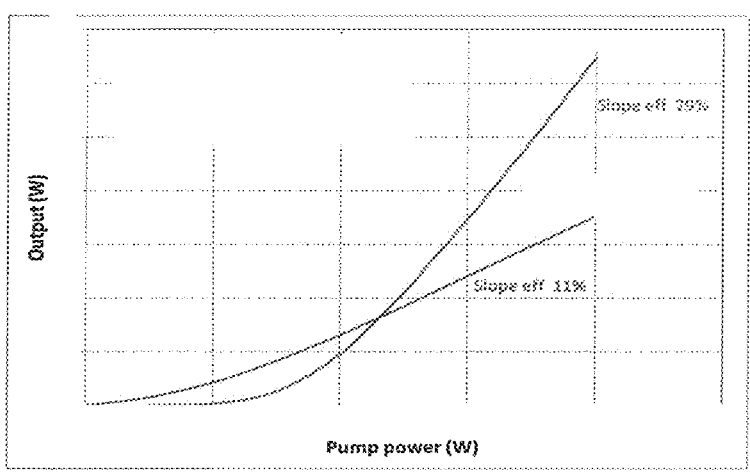
FIG.7B illustrates the dependence of the output power of differently dimensioned disclosed bulk amplifiers from a total pump power.

Based on the observed data, it is clear how to improve the characteristics of disclosed system 10 of FIGS. 3 and 6 including output power. One useful modification includes increasing the crystal length. Still another modification leading to improved results is the increased dopant concentration. Both of the above tendencies are illustrated in FIG. 7A. FIG. 7B illustrates that the output system power grows as the total pump power at the output of the fiber laser pump increases. The red curve corresponds to the crystal length greater than that of the blue curve.

Furthermore, increasing the power and brightness of the SM or low mode fiber pump allows relatively small cross-section (area) of the gain region in the amplifier crystal, i.e. the operation at power density well above $I_{sat}$. For Gaussian beams at 1-um wavelength and beam diameter ≥0.2 mm the divergence is inconsequential if the crystal length varies from 20 to 80 mm. It is clear that pumping with highly bright diffraction-limited high power beams are critical to the improved efficiency of Yb-amps.

It is understood that the host medium for Yb ions is not limited to YAG and can include a great variety of crystals. The non-limiting list of the host crystals may include garnets (LuAG, GGG etc), tungstates (e.g. KGW, KYW, KLuW), vanadates ($YVO_4$, YGdO4), fluorides (YLF, LuLiF, CaF2 etc.), borates (BOYS, GdCOB), apatites (SYS), sesquioxides ($Y_2O_3$, $Sc_2O_3$) and others. Furthermore, other rare earth ions and respective crystals can be used for the resonant pumping characterized by a high power SM fiber pump and low quantum defect.

The foregoing description and examples have been set forth merely to illustrate the main concept of the disclosure—using SM high power, bright CW pump lasers, which output a pump beam coaxially propagating with a signal light beam, for energizing bulk amplifiers. The structural specifics disclosed here are not intended to be limiting. Accordingly, disclosure should be construed broadly to include all variation within the scope of the disclosed concept.

The invention claimed is:

1. A high power single mode (SM) laser system comprising:
   a master oscillator power amplifier (MOPA) configuration including:
      a single mode (SM) seed outputting pulsed signal beam at or around a 1030 nm wavelength λs,
      a booster including an ytterbium (Yb) doped crystal or Yb crystal ceramic receiving the pulsed signal beam;
   a singlemode (SM) or low-mode (LM), continuous-wave (CW) fiber laser outputting a high brightness pump beam at a wavelength λp in a 1000 1020 nm wavelength range to end-pump the booster, wherein the pulsed signal and pump beams propagate substantially coaxially or collinearly overlapping one another in a range between 80 and 100% so as so as to provide an ultra-low quantum defect; and
   first and second wavelength discriminators flanking the booster, wherein the first and second wavelength discriminators each being a dichroic mirror or volume Bragg grating (VBG).

2. The high power SM laser system of claim 1, wherein the ultra-low quantum defect is less than 3%.

3. The high power SM laser system of claim 1 or 2, wherein the booster includes an Yb:YAG crystal, and the Yb crystal ceramic is $Yb_2O_3$ ceramic, the booster being shaped as a plate or rod.

4. The high power SM laser system of claim 1 or 2, wherein the wavelength $\lambda p$ of the high brightness pump beam varies in a 1006-1010 nm wavelength range, the ultra-low quantum effects being between 2 and 2.5%.

5. The high power SM laser system of claim 1, wherein the SM or LM CW fiber laser is operative to output the pump beam of up to a few kWs.

6. The high power SM laser system of claim 1, wherein the SM seed is configured as one or more laser diodes or a SM fiber laser operative to output a train of ultrashort signal light pulses in a fs-, ps- or ns- pulse duration range.

7. The high power SM laser system of claim 1, wherein the signal beam at an output of the booster characterized by:
- an average pulse power which varies from several hundred watts to kWs, and
- an energy per pulse in several hundred micrjoules to several milljoules range.

8. The high power SM laser system of claim 1, wherein the SM seed includes a mode-locked fiber laser.

9. The high power SM laser system of claim 1, wherein the SM seed operates in a pure pulsed mode or burst mode.

10. The high power SM laser system of claim 1, wherein the CW high brightness fiber laser outputs the pump beam such that the pump beam is coupled into one of opposite ends of the booster or both ends.

11. A booster comprising:
- an ytterbium (Yb) bulk amplifier receiving a SM signal beam at or around a 1030 nm wavelength; and
- a single or low-mode, continuous-wave (CW) fiber laser outputting high brightness pump beam coupled into one of opposite or both facets of the Yb bulk amplifier at a wavelength $\lambda p$ in a 1000-1020 nm wavelength range, wherein the SM signal and pump beams propagate overlapping one another at more than 80% so as to provide an ultra-low quantum defect of less than 3%; and further comprising at least one pre-amplifying stage.

12. The booster of claim 11, wherein the Yb bulk amplifier is configured to be a slab or rod, the ultra-low quantum defect being between 2 and 2.5%.

13. The booster of claim 11, wherein the Yb bulk amplifier includes a Yb:YAG or $Yb_2O_3$ ceramic.

* * * * *